United States Patent [19]

Abe et al.

[11] Patent Number: 5,083,626
[45] Date of Patent: Jan. 28, 1992

[54] REAR WHEEL STEERING DEVICE FOR VEHICLE WITH FOUR STEERABLE WHEELS

[75] Inventors: Masaru Abe; Takashi Kohata; Yoshimichi Kawamoto, all of Saitama, Japan

[73] Assignee: Honda Giken Kogyo Kabushiki Kaisha, Tokyo, Japan

[21] Appl. No.: 109,232

[22] Filed: Oct. 16, 1987

[30] Foreign Application Priority Data

Oct. 20, 1986 [JP] Japan .................. 61-249225
Feb. 25, 1987 [JP] Japan .................. 62-42118

[51] Int. Cl.⁵ .................................. B62D 5/04
[52] U.S. Cl. ........................... 180/79.1; 280/91
[58] Field of Search .............. 280/91, 96, 99; 180/140, 79.1, 132, 133; 318/2, 488, 489

[56] References Cited

U.S. PATENT DOCUMENTS

| | | | |
|---|---|---|---|
| 4,313,514 | 2/1982 | Furukawa et al. | 280/91 X |
| 4,415,054 | 11/1983 | Drutchas | 180/79.1 |
| 4,572,314 | 2/1986 | Anguera | 180/79.1 |
| 4,639,651 | 1/1987 | Shimizu | 180/79.1 |
| 4,666,014 | 3/1987 | Carlson et al. | 180/79.1 X |
| 4,800,974 | 1/1989 | Wand et al. | 180/79.1 |

FOREIGN PATENT DOCUMENTS

| | | | |
|---|---|---|---|
| 0101579 | 2/1984 | European Pat. Off. | |
| 0124418 | 11/1984 | European Pat. Off. | |
| 0221665 | 5/1987 | European Pat. Off. | |
| 59-50864 | 3/1984 | Japan . | |
| 60-154955 | 8/1985 | Japan | 180/79.1 |
| 60-197413 | 10/1985 | Japan | 280/91 |
| 61-31972 | 2/1986 | Japan . | |
| 61-139560 | 6/1986 | Japan | 180/79.1 |
| 61-171672 | 8/1986 | Japan | 280/91 |
| 87/02631 | 5/1987 | PCT Int'l Appl. . | |
| 2146300 | 4/1985 | United Kingdom . | |
| 2186245 | 8/1987 | United Kingdom | 280/91 |
| 2187692 | 9/1987 | United Kingdom . | |
| 2188891 | 10/1987 | United Kingdom | 180/79.1 |

Primary Examiner—Charles A. Marmor
Assistant Examiner—Richard Camby
Attorney, Agent, or Firm—Lahive & Cockfield

[57] ABSTRACT

A rear wheel steering device in a four-wheel-steerable vehicle includes a rod member having opposite ends coupled to tie rods for turning rear wheels, an electric motor, and a screw mechanism for converting rotation of the electric motor to axial motion of the rod member. The stator and rotor of the electric motor are disposed coaxially with the rod member, the motor and the screw mechanism being juxtaposed with respect to each other in the axial direction of the rod member. The screw mechanism comprises a threaded portion on the rod member and a nut engaging the threaded portion, the nut being axially pre-loaded.

15 Claims, 5 Drawing Sheets

FIG. 10b

REAR WHEEL STEERING DEVICE FOR VEHICLE WITH FOUR STEERABLE WHEELS

BACKGROUND OF THE INVENTION

1. Field of the Invention

The present invention relates to a rear wheel steering device, and more particularly to a rear wheel steering device including an electric motor for steering rear wheels in a four-wheel-steerable vehicle.

2. Description of the Relevant Art

One known motor-operated rear wheel steering device in a four-wheel-steerable vehicle is disclosed in Japanese Laid-Open Utility Model Publication No. 61-31972. The disclosed motor-operated rear wheel steering device includes a rod member extending transversely of the vehicle body and having opposite ends coupled to tie rods for turning respective rear wheels, and a ball screw mechanism combined with the rod member. An electric motor has an output shaft extending parallel to the rod member, and the ball screw mechanism has a nut member, with a speed reducer mechanism interposed between the nut member and the output shaft.

Because the rod member and the output shaft lie parallel to each other, this conventional motor-operated rear wheel steering device suffers the following problems: The gear box has large outer dimensions, imposing limitations on the spaces for storing the fuel tank below the rear seat and the spare tire below the trunk. Since the speed reducer mechanism projects from one side of the gear box, making the gear box complex in shape, the gear box must be formed by a costly casting process. It is necessary to keep parallelism between the rod member and the motor output shaft and their dimensional tolerances at high accuracy, so that these parts should be machined by a costly precision machining process.

Japanese Laid-Open Patent Publication No. 59-50864 discloses a rack-and-pinion front wheel steering device employing an electric motor for producing assistive steering power. The disclosed rack-and-pinion front wheel steering device includes a rack shaft on which the stator and rotor of the motor are mounted, and a ball screw mechanism disposed between the rotor and the rack shaft for converting rotation of the rotor to linear motion of the rack shaft. The rack shaft has rack teeth on one end portion thereof which are held in mesh with the pinion gear on a steering gear input shaft. The ball screw mechanism is disposed on the other end portion of the rack shaft. The ball screw mechanism includes a ball nut around which the rotor of the motor is disposed. Therefore, the rotor of the motor is spaced radially outwardly from the outer periphery of the rack shaft by a distance substantially corresponding to the wall thickness of the ball nut.

In the case where the above conventional steering device is employed as the rear wheel steering device in a four-wheel-steerable vehicle, the following considerations must be taken into account: Since the rotor of the motor is spaced from the outer periphery of the rack shaft, the moment of inertia of the rotor is comparatively large and hence the rotor tends to start rotating with a delay in response to energization of the motor. This does not cause any problem in the front wheel steering device in which the wheels are turned manually through the rack-and-pinion mechanism. However, since the rear wheel steering device is operated by the motor only, the above problem is quite important in the rear wheel steering device since it creates a delayed response in the rear wheel steering action. Another drawback is that since the ball screw mechanism necessarily has axial play or backlash between the ball nut and screw due to structural limitations, it is possible for the rear wheels to be turned under external forces when the rear wheels are in a steered or neutral condition. This play can be cancelled out by the rack-and-pinion mechanism in the front wheel steering device. However, it is of great consequence in the rear wheel steering device to eliminate such play since the rear wheel steering device has no rack-and-pinion mechanism. Japanese Laid-Open Utility Model Publication No. 61-31972, as referred to above, discloses a lock device for preventing the rotor of the motor from rotating while the rear wheels are in the neutral condition. However, the rear wheel steering device is not free from external forces applied while the rear wheels are being turned.

The present invention has been made in view of the foregoing difficulties.

SUMMARY OF THE INVENTION

According to the present invention, there is provided a rear wheel steering device in a four-wheel-steerable vehicle, comprising an electric motor having a stator and a rotor, a plurality of tie rods for turning rear wheels, a rod member extending transversely of the vehicle and having opposite ends coupled to the tie rods, respectively, and a screw mechanism disposed on the rod member for converting rotation of the electric motor to axial motion of the rod member, the stator and rotor of the electric motor being disposed coaxially with the rod member, the motor and the screw mechanism being juxtaposed with respect to each other in the axial direction of the rod member. The rotor of the motor is rotatably disposed immediately around the rod member. The screw mechainsm comprises a threaded portion of the rod member and a nut engaging the threaded portion and rotatable in response to rotation of the rotor. The nut may be a single ball nut which is assembled in an axially pre-loaded condition, or may be a double ball nut including a pair of ball nut members axially pre-loaded in a direction away from each other. The nut may also be a single screw nut, or a screw nut comprising two nut members separate along an axial direction thereof and coupled to each other through a spacer seat, or a screw nut comprising two nut members juxtaposed in an axial direction thereof and coupled to each other by a fastener.

Therefore, the motor-operated rear wheel steering device has a gear box of a small size which does not impose space limitations on a fuel tank and a spare tire housing. The gear box is of a simple structure, a portion of which may be a cylindrical case that is extrusion-molded of iron. It is not necessary to employ a special play cancelling mechanism and no high accuracy for tolerances of the components is required. Thus, the rear wheel steering device is reduced in cost.

According to the present invention, there is also provided a motor-operated rear wheel steering device in which the moment of inertia of the rotor of an electric motor is relatively small and hence the motor can be started quickly, so that the rear wheels can be turned with a good response.

According to the present invention, there is also provided a highly reliable motor-operated rear wheel steering device in which rear wheels can be prevented from being turned under external forces while they are in steered and neutral conditions.

The above and further details and advantages of the present invention will become apparent from the following detailed description of preferred embodiments thereof, when read in conjunction with the accompanying drawings.

DETAILED DESCRIPTION OF THE PREFERRED EMBODIMENTS

Figure 1:
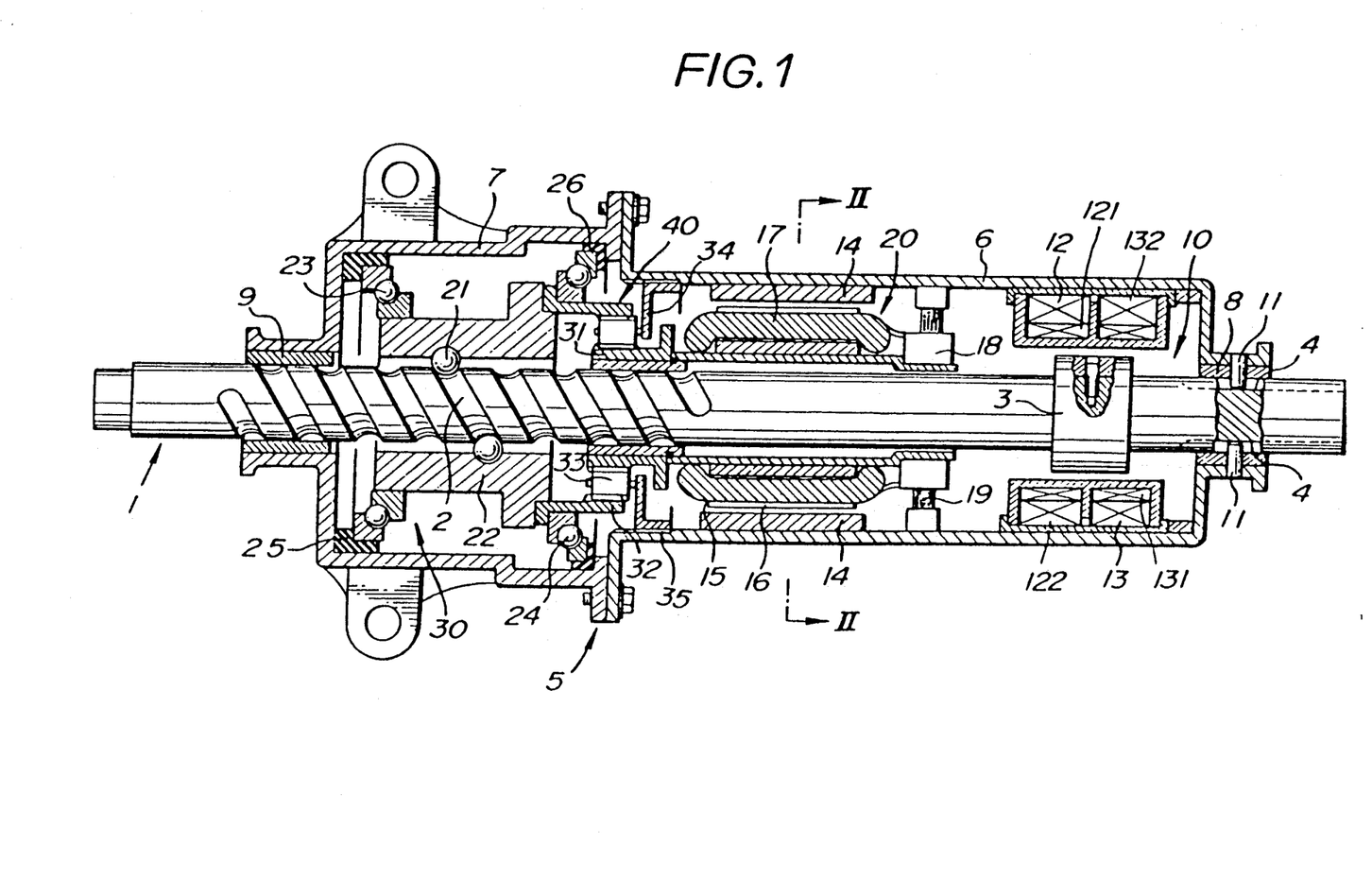
FIG. 1 is a longitudinal cross-sectional view of a rear wheel steering gear device according to an embodiment of the present invention.

FIG. 1 shows a steering gear box in longitudinal cross section. A rod member 1 extending transversely of a vehicle body has a screw groove 2 defined in and over an outer periphery of one end portion. A metal core 3 is secured to and around the rod member 1 in the other end portion. The rod member 1 has a plurality of axial grooves 4 defined in its outer periphery at an end right-hand end in FIG. 1) near the metal core 3. The rod member 1 is supported by end guides 8, 9 in the opposite ends of the gear box 5. Pins 11 are fixed to the righthand end of the gear box 5 and engage in the respective grooves 4 for preventing the rod member 1 from rotating about its own axis.

Figure 2:
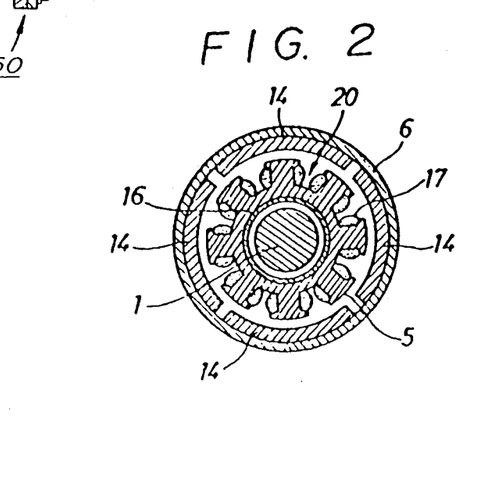
FIG. 2 is a cross-sectional view taken along line II—II of FIG. 1.

The gear box 5 comprises a combination of a cylindrical case 6 which is extrusion-molded of iron and a case 7 which is cast of aluminum, the cases 6, 7 being axially fastened to each other. The pins 11 are disposed on the outer end of the cylindrical case 6. Coil assemblies 12, 13 are securely mounted on the inner periphery of the cylindrical case 6 near the outer end thereof. The coil assembly 12 comprises an inner primary coil 121 and an outer secondary coil 122, and the coil assembly 13 comprises an inner primary coil 131 and an outer secondary coil 132. The coil assemblies 12, 13 are positioned around the metal core 3. The coil assemblies 12, 13 and the metal core 3 jointly constitute a differential transformer steering angle detector 10. As also shown in FIG. 2, a plurality of permanent magnets 14 serving as a stator are fixedly mounted on the inner periphery of the cylindrical case 6. A cylindrical rotor 15 is rotatably supported on the rod memer 1 in radially inwardly spaced relation to the permanent magnets 14. The cylindrical rotor 15 is electrically connected to an external circuit through a commutator 18 and a brush 19. The rotor 15 comprises an iron core 16 and coils 17. The stator 14, the rotor 15, the commutator 18, and the brush 19 jointly serve as an electric motor 20 disposed coaxially with the rod member 1.

A ball nut member 22 is threaded over the rod member 1 through a number of balls 21 riding in the screw groove 2. The ball nut member 22 is rotatably supported in the aluminum case 7 by means of angular ball bearings 23, 24 and rubber cushions 25, 26 at the axially opposite ends of the ball nut member 22. The screw groove 2, the balls 21, and the ball nut member 22 jointly constitute a ball screw mechanism 30. The ball screw mechanism 30 and the electric motor 20 are juxtaposed in the axial direction of the rod member 1. A speed reducer mechanism 40 is disposed and coupled between the ball nut member 22 and the rotor 15. More specifically, the speed reducer mechanism 40 comprises a sun gear 31 securely fixed to the rotor 15, a ring gear 32 securely fixed to the ball nut member 22, and a plurality of planet gears 33 meshing between the sun and ring gears 31, 32. The planet gears 33 are rotatably supported on a ring plate 34 having an externally threaded outer surface 35 which is threaded in the cylindrical case 6.

Figure 3:
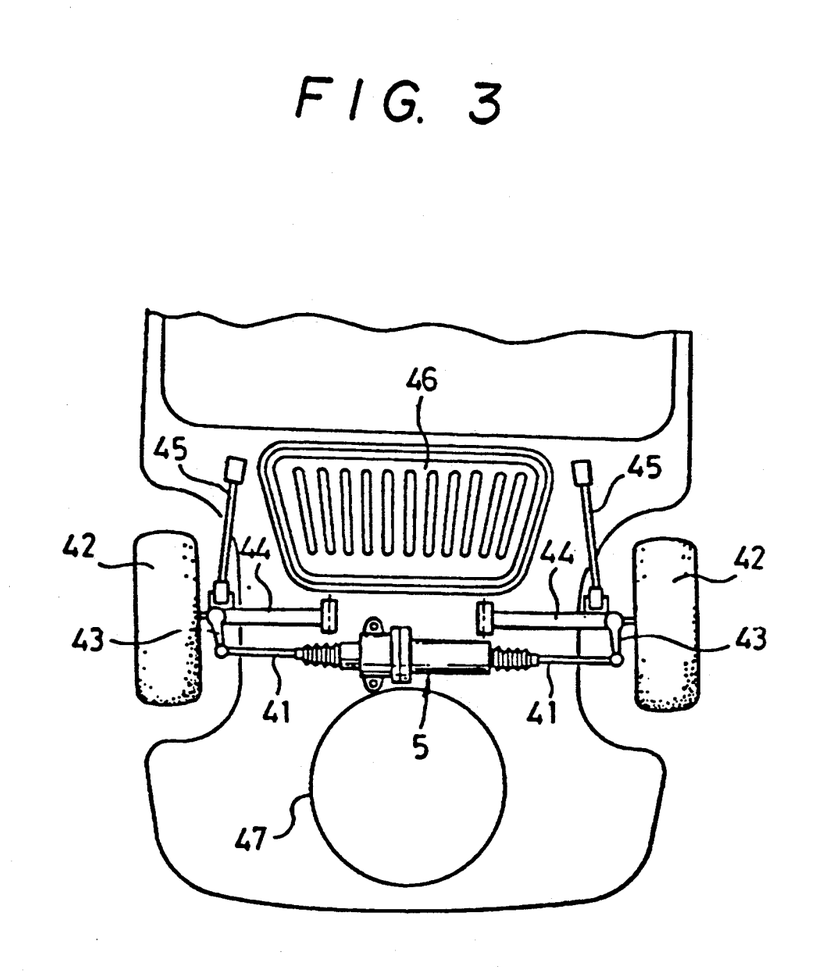
FIG. 3 is a fragmentary bottom view of a rear vehicle portion where the steering gear device is positioned.

As shown in FIG. 3, the opposite ends of the rod member 1 assembled in the gear box 5 are operatively coupled to respective tie rods 41 to which there are connected knuckle arms 43 that support rear wheels 42, respectively. The rear wheels 42 are also coupled to lower arms 44 and radius rods 45. The gear box 5 is disposed between a fuel tank 46 below the rear seat of the automobile and a spare tire housing 47 below the trunk behind the fuel tank 46.

Operation of the electric motor 20 is controlled according to the steering angle of front wheels (not shown), the speed of the vehicle, and other parameters. The rotation of the rotor 15 of the energized motor 20 is transmitted through the speed reducer mechanism 40 to the ball nut member 22 of the ball screw mechanism 30, and then converted by the balls 21 and the screw groove 2 to linear motion of the rod member 1 in the transverse direction of the vehicle body for enabling the tie rods 41 and the knuckle arms 43 to turn the rear wheels 42.

The rubber cushions 25, 26 between the bearings 23, 24 and the case 7 have extra thicknesses as a slight interferance, and the resiliency of the rubber material of the rubber cushions 25, 26 is appropriately selected, so that, with the rubber cushions 25, 26 placed in position being compressed, the ball nut member 22 is axially preloaded under compression to cancel any play or backlash thereof. It is therefore not necessary to provide a mechanical play cancelling mechanism. Shocks applied in the axial direction of the rod member 1 under high loads can be absorbed by the rubber cushions 25, 26 for thereby protecting the ball screw mechanism 30 which is expensive.

Inasmuch as the electric motor 20 is disposed coaxially with the rod member 1, the gear box 5 is smaller in size and simpler in construction than would be if the motor 20 and the rod member 1 were parallel to each other as with the conventional arrangement. No space limitations are imposed on the gear box 5 even if it is positioned between the fuel tank 46 and the spare tire housing 47 as shown. Since the cylindrical case 6 that is extrusion-molded of iron can be employed, the gear box 5 is less costly than would be if it were entirely cast of iron. As no mechanism for mechanically cancelling play or backlash in the ball screw mechanism is required, and no high accuracy is required for the tolerances of the various parts, a further cost reduction is possible. The speed reducer mechanism 40 of the planetary gear type which is of small dimensions can also be employed.

Figure 4:
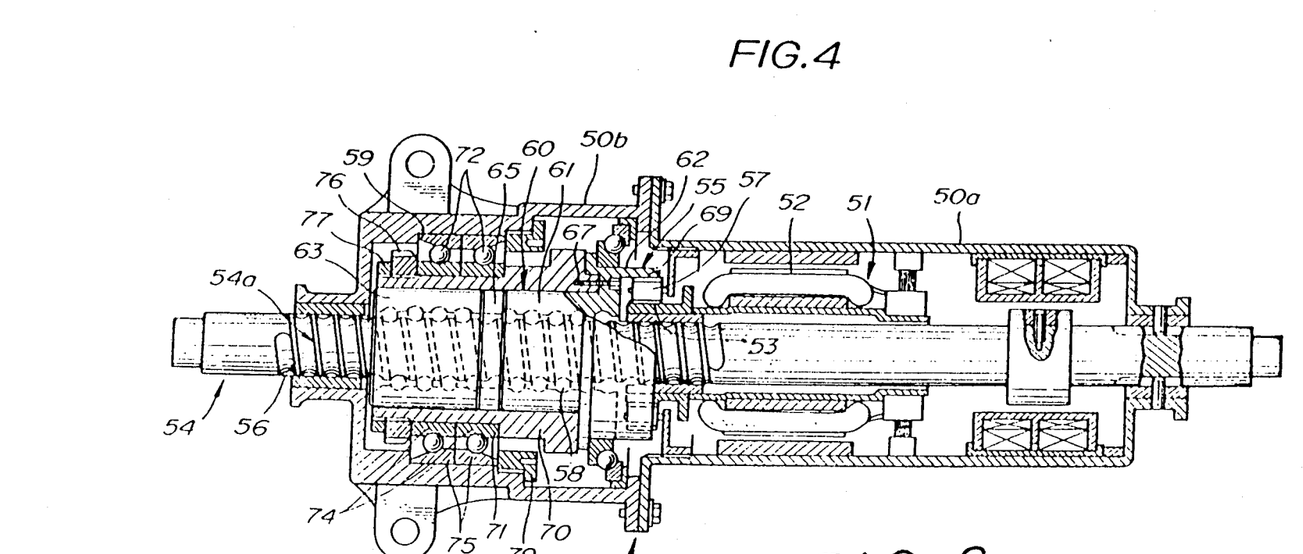
FIG. 4 is a longitudinal cross-sectional view of a rear wheel steering gear device according to another embodiment of the present invention, with a double ball nut shown in fragmentary plan.

FIG. 4 shows a rear wheel steering gear box according to another embodiment of the present invention. A gear box 50 houses therein an electric motor 51 and a ball screw mechanism 55 which are juxtaposed with respect to each other. The ball screw mechanism 55 comprises a screw groove 56 defined in a rod member 54, balls 58, and a double ball nut 60. The screw groove 56 is defined in the outer periphery of a left-hand (as shown) end portion 54a of the rod member 54. The double ball nut 60 is rotatably and axially movably mounted on the externally threaded portion 54a through the balls 58 riding in the screw groove 56. The double ball nut 60 comprises a pair of ball nut members 63, 61 and a central spacer seat 65 disposed between ball nut members 63, 61. A sleeve 70 is securely fitted over the double ball nut 60. The ball nut member 61 (shown on the right-hand side) has a flange 62 on its righthand end which is fastened to the righthand end of the sleeve 70 by means of bolts 67.

The gear box 50 comprises a pair of axially separate cases 50a, 50b. A pair of ball bearings 72 is interposed between the case 50b (shown on the left-hand side) and the intermediate portion of the sleeve 70. The flange 62 of the right-hand ball nut member 61 is integral with a ring gear 69 is operatively held in mesh with a sun gear 53 integral with a rotor 52 of the motor 51 through planet gears 57.

Figure 7:
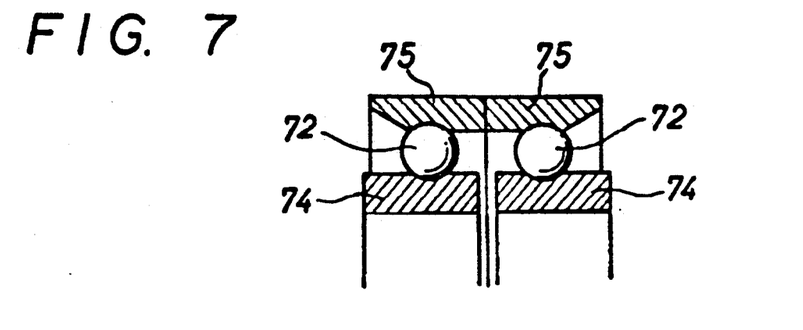
FIG. 7 is a fragmentary cross-sectional view of bearings before they are assembled in position.

The ball bearings 72 have respective inner races 74 axially confined between a step 71 on the right-hand outer peripheral surface of the sleeve 70 and a fastening nut 76 and a lock nut 77 which are threaded over the sleeve 70 from its left-hand end. The outer races 75 of the respective ball bearings 72 axially confined between a step 59 on the inner peripheral surface of the left-hand case 50b and a screw member 79 which is threaded in the left-hand case 50b from its right-hand end. When the bearings 72 are to be assembled in position, there is initially a gap between the inner races 74 thereof, as shown in FIG. 7. This gap is then eliminated by fastening the inner races 74 between the step 71 and the fastening nut 76 thereby to remove axial play between the sleeve 70 and the gear box 50.

Figure 5:
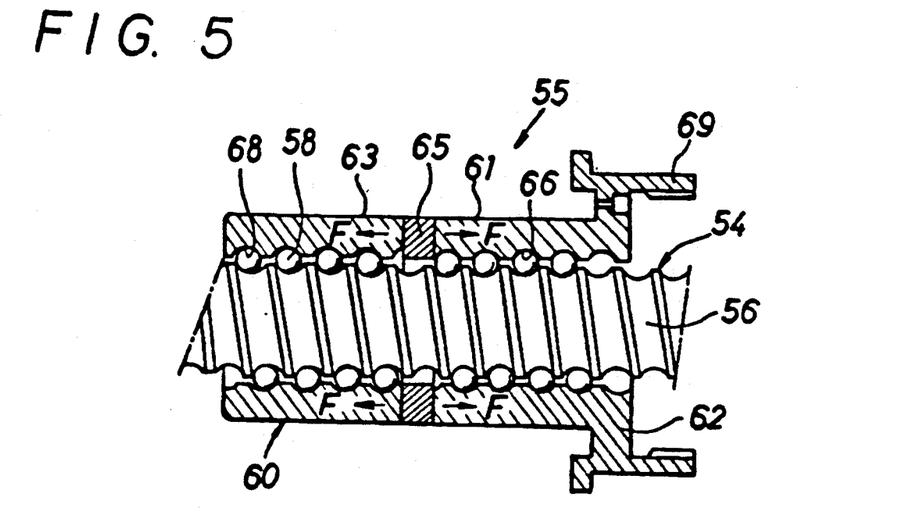
FIG. 5 is a longitudinal cross-sectional view of the double ball screw mechanism shown in FIG. 4.
Figure 6:
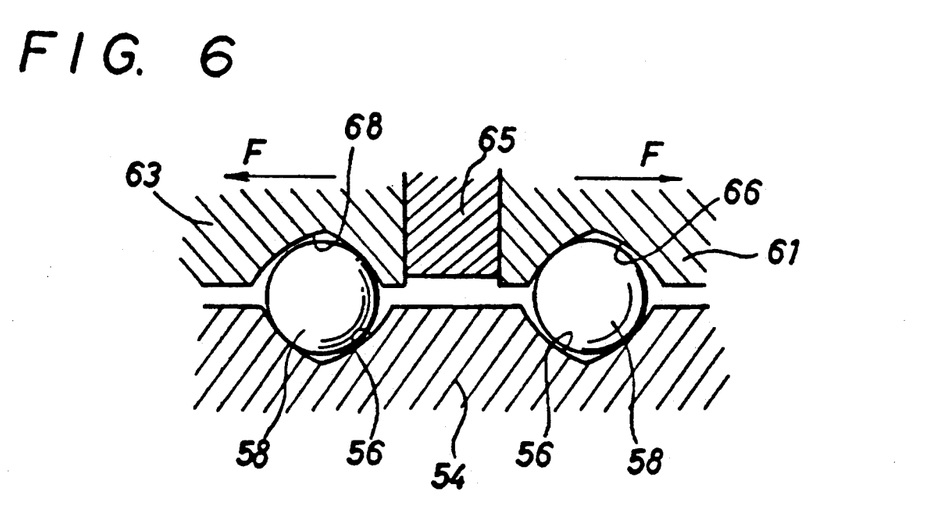
FIG. 6 is an enlarged fragmentary cross-sectional view of FIG. 5.

The spacer seat 65 between the ball nut members 61, 63 has a sufficiently large thickness to pre-load the ball nut members 61, 63. More specifically, the spacer seat 65 inserted between the ball nut members 61, 63 forcibly displaces them outwardly apart from each other for thereby pre-loading them. Therefore, as shown in FIGS. 5 and 6, in the presence of the central spacer seat 65, the ball nut members 61, 63 are normally subject to large pre-loading forces F in directions to force the ball nut members 61, 63 apart from each other. The pre-loading forces F cause the balls 58 to place the rod member 54 under a large tensile load. Therefore, any axial play or backlash between the ball screw groove 56, the balls 58, and the ball screw grooves 66, 68 of the ball nut members 61, 63 is eliminated for developing large friction between the rod member portion 54a and the double ball nut 60.

Since large friction is produced between the rod member portion 54a and the double ball nut 60, as described above, the axial rigidity of the rod member 54 can be increased and its strength against bending stresses can also be increased.

When external forces are applied to the rod member 54 from the rear wheels through the tie rods, the double ball nut 60 is prevented from being rotated by such external forces because of the large friction in the absence of any axial play. The double ball nut 60 remains self-locked until external forces imposed from the rod member 54 exceed the high friction load thereof, so that the rear wheels are prevented from being turned under external forces when they are in steered and neutral conditions.

Accordingly, no separate lock device is necessary, and the structure is simple and small. The rear wheels can be maintained accurately in the steered and neutral conditions, so that the rear wheels can be steered with increased reliability. The rear wheel steering gear box 50 can be mounted on the vehicle body with high rigidity.

Experimental data indicate that while friction of 6.6 kgfcm was produced by normal tensile pre-loading, friction of 15.0 kgfcm was generated by tensile pre-loading using the sufficiently thick spacer seat. External forces in excess of such large friction are rare in normal running conditions. The friction thus generated does not affect in any way the driver's operation of the steering wheel since the rear wheel steering device is operated by the motor, and only the motor is required to have a capacity to overcome such friction.

The rod member may be pre-loaded under compressive forces by using a thin spacer seat, with its thickness selected to meet desired pre-loading forces. The rigidity of the rod member in the axial direction and against bending stresses can be increased by such compressive pre-loading. The rigidity against bending stresses is greater with the illustrated tensile pre-loading arrangement using the sufficiently thick spacer seat than with the compressive pre-loading arrangement. However, the present invention includes both tensile and compressing pre-loading principles.

The strength against external forces can be increased by reducing the pitch of the ball screw mechanism, i.e., the amount the rod member axially moves during one revolution of the ball nut, to a length of 6 mm or less, for example.

Figure 8:
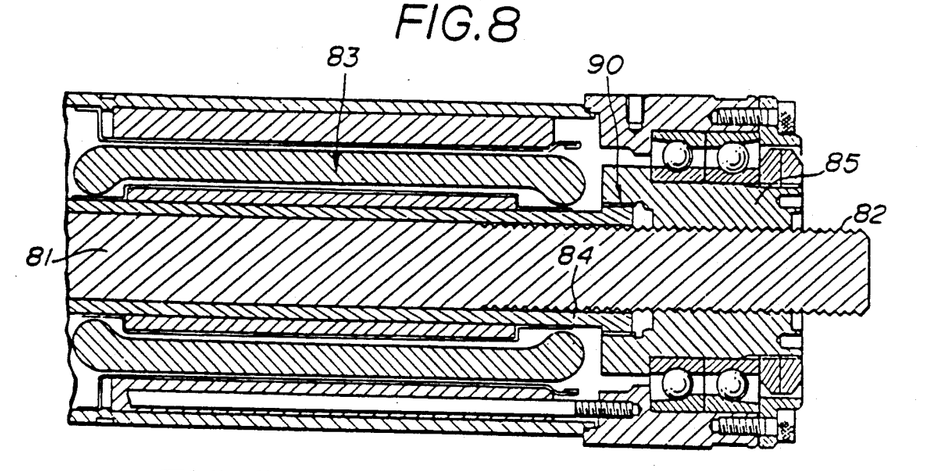
FIG. 8 is a fragmentary cross-sectional view of a rear wheel steering device according to still another embodiment of the present invention.

FIG. 8 illustrates still another embodiment in which an electric motor 83 is disposed coaxially with a rod member 81 and a screw nut member 85 is directly threaded over a threaded or screw-groove portion 82 of the rod member 81 to provide protection from applied external forces. More specifically, the screw groove 82 is defined in the outer periphery of the rod member 81, and the screw nut member 85 threaded over the threaded portion 82 of the rod member 81 is splined at 90 to a rotor 84 of the motor 83.

The screw nut member 85 directly threaded over the threaded portion 82 for transmitting rotation from the motor 83 can prevent unwanted axial displacement of the rod member 81 which would otherwise be caused by external forces applied.

Figure 9A:
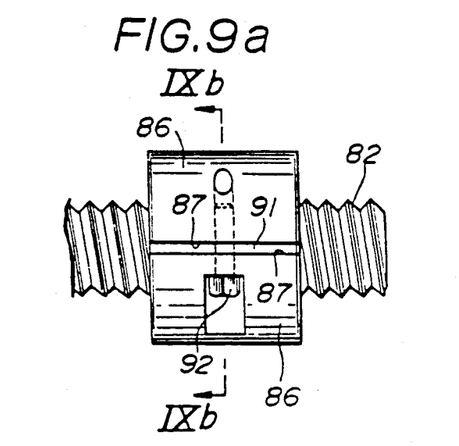
FIG. 9(a) is a plan view of screw nut members separate along an axial direction and coupled by fasteners, the screw nut members being threaded over a screw shaft.
Figure 9B:
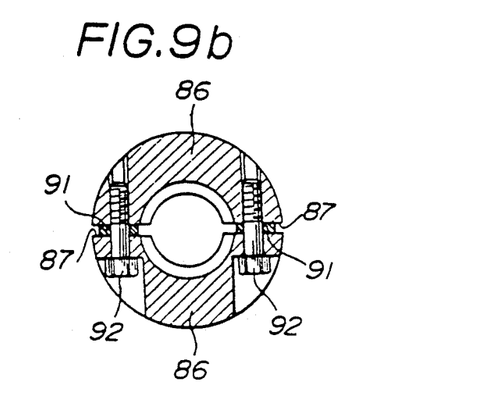
FIG. 9(b) is a cross-sectional view taken along line IXb—IXb of FIG. 9(a)

FIGS. 9(a) and 9(b) show two separate nut members 86 divided along the axial direction of the rod member 81 have confronting surfaces 87, respectively, between which spacer seats 91 are sandwiched. The nut members 86 are coupled to each other by means of bolts 92 extending through the spacer seats 91. The degree of resistance presented by the nut members 86 against axial displacement of the rod member 81 can be adjusted by the bolts 92.

Figure 10A:
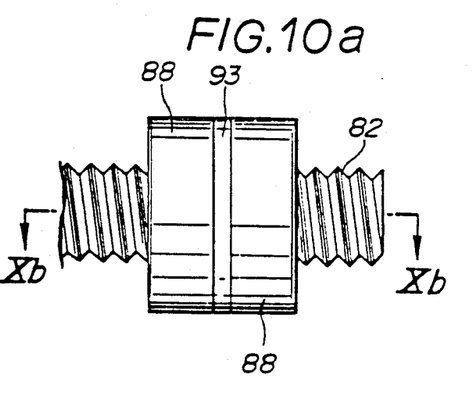
FIG. 10(a) is a plan view of screw nut members juxtaposed in an axial direction and coupled by fasteners, the screw nut members being threaded over a screw shaft.
Figure 10B:
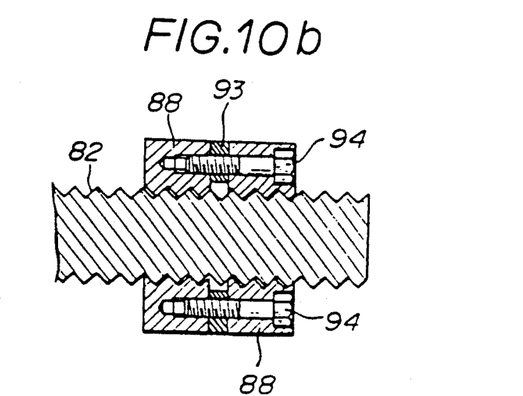
FIG. 10(b) is a cross-sectional view taken along line Xb—Xb of FIG. 10(a).

FIGS. 10(a) and 10(b) show two separate nut members 88 juxtaposed along the axial direction of the rod member 81 and coupled to each other by bolts 94 extending through spacer seats 93 located between the nut members 88. The spacer seats 93 are pre-loaded to prevent the rod member 81 from being axially displaced under external forces applied thereto.

Although there have been described what are at present considered to be the preferred embodiments of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

We claim:

1. A rear wheel steering device in a four-wheel-steerable vehicle, comprising:
   an electric motor having a stator and a rotor;
   a plurality of tie rods for turning rear wheels;
   a rod member extending transversely of the vehicle and having opposite ends coupled to respective ones of said tie rods;
   a screw mechanism disposed on said rod member for converting rotation of said electric motor to axial motion of said rod member;
   said stator and rotor of said electric motor being disposed coaxially with said rod member, said motor and said screw mechanism being juxtaposed with respect to each other in the axial direction of said rod member;
   said screw mechanism comprising
   a threaded portion on said rod member and
   a nut engaging said threaded portion and rotatable in response to rotation of said rotor;
   said nut comprising a ball nut on said threaded portion,
   said threaded portion engaging said ball nut through a plurality of balls therebetween;
   said ball nut being axially pre-loaded under compression by cushion members disposed closely to axially opposite ends of the ball nut and held under compression;
   a steering gear box housing therein
   said electric motor,
   a major part of said rod member, and
   said screw mechanism;
   bearing means supporting said ball nut so as to enable it to be rotatable in said steering gear box; and
   said cushion members being interposed between said bearing means and said steering gear box.

2. A rear wheel steering device according to claim 1, wherein said rotor is rotatably disposed on said rod member.

3. A rear wheel steering device according to claim 1, wherein said nut comprises a screw nut directly threaded over said threaded portion of the rod member.

4. A rear wheel steering device according to claim 1, further including a speed reducer mechanism operatively coupling said rotor and said nut.

5. A rear wheel steering device according to claim 4, wherein said speed reducer mechanism is disposed coaxially with said rod member between said electric motor and said screw mechanism.

6. A rear wheel steering device according to claim 5, wherein said speed reducer mechanism comprises a sun gear fixed to either one of said rotor and said nut, a ring gear fixed to the other, and a plurality of planet gears meshing between said sun gear and said ring gear.

7. A rear wheel steering device according to claim 1, wherein said means comprises a pin fixed to said steering gear box and a groove formed in said rod member for engagement with said pin.

8. A rear wheel steering device according to claim 1, further including steering angle detecting means disposed in said steering gear box.

9. A rear wheel steering device according to claim 8, wherein said steering angle detecting means comprises a metal core mounted on said rod member and a pair of coil assemblies mounted on an inner wall of said steering gear box.

10. A rear wheel steering device in a four-wheel steerable vehicle, comprising:
    an electric motor having a stator and a rotor;
    a plurality of tie rods for turning rear wheels;
    a rod member extending transversely of the vehicle and having opposite ends coupled to respective ones of said tie rods;
    a screw mechanism including a threaded portion of said rod member and a ball nut engaging said threaded portion through a plurality of balls therebetween, said ball nut being rotatable in response to rotation of said rotor;
    said stator and rotor of said electric motor being disposed coaxially with said rod member, said motor and said screw mechanism being juxtaposed with respect to each other in the axial direction of said rod member,
    and wherein said ball nut comprises a pair of axially juxtaposed ball nut members and a spacer seat interposed therebetween, said ball nut members being pre-loaded to coact on said rod member.

11. A rear wheel steering device in a four-wheel steerable vehicle, comprising:
    an electric motor having a stator and a rotor;
    a plurality of tie rods for turning rear wheels;
    a rod member extending transversely of the vehicle and having opposite ends coupled to respective ones of said tie rods;
    a screw mechanism including a threaded portion of said rod member and a screw nut directly threaded over said threaded portion of the rod member and rotatable in response to rotation of said rotor,
    said stator and rotor of said electric motor being disposed coaxially with said rod member, said motor and said screw mechanism being juxtaposed with respect to each other in the axial direction of said rod member, and wherein said screw nut includes a pair of nut members separated along the axial direction thereof, a spacer seat disposed between said nut members, and a fastener coupling said nut members to each other in sandwiching relation to said spacer seat.

12. A rear wheel steering device in a four-wheel steerable vehicle, comprising:

an electric motor having a stator and a rotor;

a plurality of tie rods for turning rear wheels;

a rod member extending transversely of the vehicle and having opposite ends coupled to respective ones of said tie rods;

a screw mechanism including a threaded portion of said rod member and a screw nut directly threaded over said threaded portion of the rod member and rotatable in response to rotation of said rotor, said stator and rotor of said electric motor being disposed coaxially with said rod member, said motor and said screw mechanism being juxtaposed with respect to each other in the axial direction of said rod member, and wherein said screw nut includes a pair of nut members juxtaposed in the axial direction thereof and a spacer seat sandwiched between said nut members, and a fastener coupling said nut members to each other through said spacer seat.

13. A rear wheel steering device in a four-wheel-steerable vehicle, comprising:

an electric motor having a stator and a rotor;

a plurality of tie rods for turning rear wheels;

a rod member extending transversely of the vehicle and having opposite ends coupled to respective ones of said tie rods;

a screw mechanism disposed on said rod member for converting rotation of said electric motor to axial motion of said rod member;

a steering gear box housing therein said electric motor, a major part of said rod member and said screw mechanism; and means provided on said steering gear box for preventing said rod member from rotating about its own axis;

said stator and rotor of said electric motor being disposed coaxially with said rod member, said motor and said screw mechanism being juxtaposed with respect to each in the axial direction of said rod member;

said screw mechanism comprising
 a threaded portion on said rod member and
 a nut engaging said threaded portion and rotatable in response to rotation of said rotor;

said nut comprising a ball nut on said threaded portion,
 said threaded portion engaging said ball nut through a plurality of balls therebetween; and
said ball nut comprising
 a pair of axially juxtaposed ball nut members and a spacer seat interposed therebetween,
 said ball nut members being pre-loaded to coact on said rod member.

14. A rear wheel steering device in a four-wheel-steerable vehicle, comprising:

an electric motor having a stator and a rotor;

a plurality of tie rods for turning rear wheels;

a rod member extending transversely of the vehicle and having opposite ends coupled to respective ones of said tie rods;

a screw mechanism disposed on said rod member for converting rotation of said electric motor to axial motion of said rod member;

a steering gear box housing therein said electric motor, a major part of said rod member and said screw mechanism; and means provided on said steering gear box for preventing said rod member from rotating about its own axis;

said stator and rotor of said electric motor being disposed coaxially with said rod member, said motor and said screw mechanism being juxtaposed with respect to each in the axial direction of said rod member;

said screw mechanism comprising
 a threaded portion on said rod member and
 a nut engaging said threaded portion on said rod member and rotatable in response to rotation of said rotor;

said nut comprising a screw nut directly threaded over said threaded portion of the rod member; and said screw nut comprising
 a pair of nut members separated along the axial direction thereof
 a spacer seat disposed between said nut members, and
 a fastener coupling said nut members to each other in sandwiching relation to said spacer seat.

15. A rear wheel steering device in a four-wheel-steerable vehicle, comprising:

an electric motor having a stator and a rotor;

a plurality of tie rods for turning rear wheels;

a rod member extending transversely of the vehicle and having opposite ends coupled to respective ones of said tie rods;

a screw mechanism disposed on said rod member for converting rotation of said electric motor to axial motion of said rod member;

a steering gear box housing therein said electric motor, a major part of said rod member and said screw mechanism; and means provided on said steering gear box for preventing said rod member from rotating about its own axis;

said stator and rotor of said electric motor being disposed coaxially with said rod member, said motor and said screw mechanism being juxtaposed with respect to each in the axial direction of said rod member;

said screw mechanism comprising
 a threaded portion on said rod member and
 a nut engaging said threaded portion and rotatable in response to rotation of said rotor;

said nut comprises a screw nut directly threaded over said threaded portion of the rod member; and said screw nut comprises
 a pair of nut members juxtaposed in the axial direction thereof,
 a spacer seat sandwiched between said nut members, and
 a fastener coupling said nut members to each other through said spacer seat.

* * * * *